April 12, 1938. K. TESSKY 2,113,668
LATHE
Filed April 26, 1937
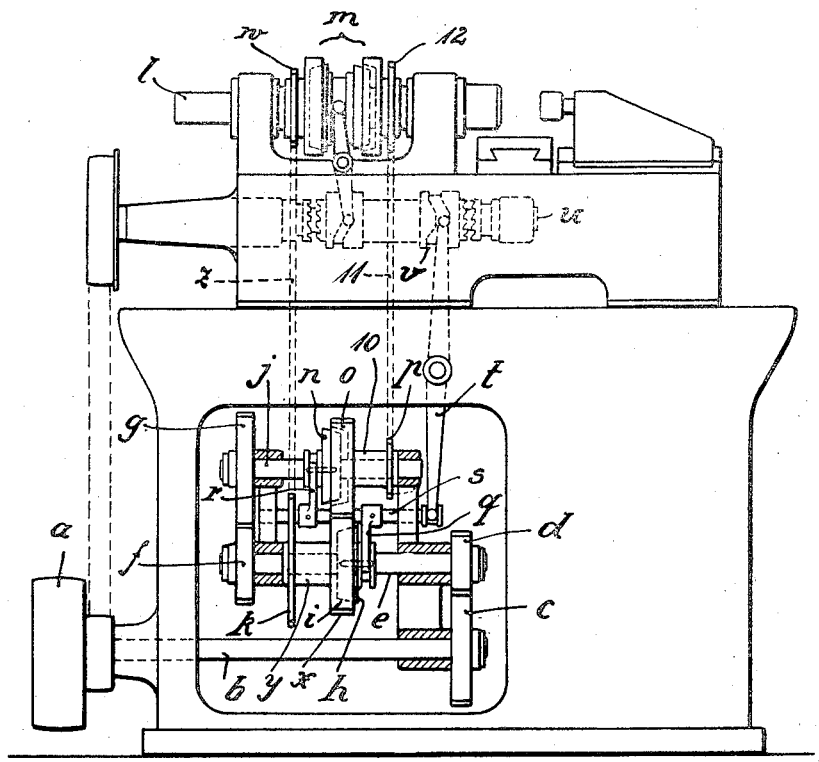
Inventor:
Karl Tessky
by Michaelis & Michaelis
Attys Patented Apr. 12, 1938

2,113,668

UNITED STATES PATENT OFFICE 2,113,668

LATHE

Karl Tessky, Esslingen-on-the-Neckar, Germany

Application April 26, 1937, Serial No. 138,989
In Germany May 8, 1936

2 Claims. (Cl. 29—53)

My invention relates to automatic lathes and more especially to lathes, in which the spindle can be reversed for running in either direction by means of a double friction coupling.

While in the known automatic lathes of this kind the number of revolutions of the spindle can be adjusted to higher and lower speed for running in either direction, the ratio of the numbers of revolutions in one and the other direction remains always alike.

It is an object of my invention to improve lathes of this kind by rendering the ratio of the number of revolutions, when reversing from one direction to the other, variable.

It is true that in certain devices of this type this could already be obtained, however only with means whereby the gear is rendered complicated and expensive and the number of shafts and gear wheels is greatly increased, which involves the generation of great noise and a great power consumption in view of increased friction between co-operating parts.

In contradistinction to the means hitherto employed for this purpose, I employ extremely simple means, consisting only in two intermediate shafts and two pairs of gear wheels, one of which is a pair of change wheels, this combination of means enabling me to not only raise or lower the number of revolutions of the spindle in one or the other direction, according to the requirements of each individual case, but to also vary the ratio of the two numbers of revolution, in accordance with the cutting speed required, by readily replaceable change wheels.

According to the present invention two parallel intermediate shafts, connected by change wheels, are provided, which are driven from the main drive of the lathe, each of the shafts carrying a friction coupling which, by means of a belt, chain or the like, transmits power on to one of the two members of the usual friction change speed gear mounted on the spindle. Each friction coupling is operatively connected by means of a toothed rim with a similar rim of the friction coupling mounted on the other intermediate shaft and the shiftable parts of the couplings are so adjusted, that the two couplings can only be thrown in alternatingly.

In the drawing affixed to this specification and forming part thereof a lathe embodying my invention is illustrated diagrammatically in elevation, partly in axial section, by way of example.

$a$ is the main pulley and $b$ is the main shaft of the lathe, while $c$ and $d$ are change wheels serving to transmit power to the two intermediate shafts $e$ and $j$. Obviously by exchanging or replacing the wheels $c$, $d$ the cutting speeds can be adapted to the material and to the diameter of the blanks to be acted upon in each individual case.

According to this invention now the intermediate shafts $e$ and $j$ are coupled with each other by a pair of change wheels $f$ and $g$. On the shaft $e$ is mounted for axial displacement the friction cone $h$ of a friction coupling, which is carried along by the shaft $e$ by means of a slot and key connection. On the shaft $e$ is further loosely mounted the hollow friction cone $i$ of this coupling, which is formed with a toothed rim $x$ and on the hub $y$ of which is mounted a sprocket-wheel $k$ which by means of a chain indicated at $z$ drives the sprocket-wheel $w$ mounted on the left hand side of the double friction coupling $m$ mounted on the spindle $l$ of the lathe.

On the intermediate shaft $j$ is mounted for axial displacement, but secured against rotation on the shaft, the cone $n$ of another friction coupling. On the same shaft is loosely mounted the hollow cone formed with a toothed rim $o$, the hub $10$ of which carries the sprocket-wheel $p$, which by means of a chain indicated at $11$ drives a sprocket-wheel $12$ mounted on the right hand side of the friction coupling $m$. The operating arm $q$ of the coupling $h$, $i$ is mounted on the same rod $s$ with the arm $r$ of the coupling $n$, $o$ in such manner that only one of the two couplings, but never both can be thrown in at a time. The shifting of the rod $s$ with the two forks $q$ and $r$ for the throwing in and out or the couplings is here effected by means of a double-armed lever $t$ acted upon by a drum cam $v$ mounted on an intermediate shaft $u$ and carried along by means of a clutch of known design.

When the coupling $h$, $i$ is thrown in, the hollow cone $i$ drives directly the sprocket-wheel $k$ and the left hand half of the double friction coupling $m$ at the comparatively high number of revolutions which results from the ratio of the number of teeth on the wheels $k$ and $w$. Indirectly, by means of the toothed rims $x$ and $o$, the loose friction cone $o$ is driven, which by means of the sprocket-wheel $p$ drives the sprocket-wheel $12$ and the right hand portion of the double friction coupling $m$, however, in view of the lower gear ratio of the two sprocket-wheels, at lower speed.

By means of a double-armed lever $t$ and the clutch mounted on the intermediate shaft $u$ the lathe spindle can easily be coupled with the high speed part, rotating in one direction or with the low speed part, rotating in the opposite direction, of the coupling m.

The ratio of the number of rotations in one direction to the number of rotations in the opposite direction is determined by the ratio of the number of teeth of the sprocket-wheels and of the toothed rims x and o.

If instead of coupling h, i the coupling n, o is thrown in, the intermediate shaft e transmits through the change wheels f, g power onto the intermediate shaft j, which in view of the different gear ratio of the change wheels rotates with another (lower) number of revolutions than shaft e. It carries the hollow cone o and sprocket-wheel p along and through the toothed rims x and o the sprocket-wheel k at a lower speed than before.

Now the spindle l, no matter whether it is coupled with the left hand part or the right hand part of the double friction coupling m rotates at a lower number of revolutions, however the ratio of the numbers of revolutions in both directions at first remains unchanged. This ratio can now be changed also in a simple manner by either exchanging the change wheels f, g on the shafts e and j or by replacing them by wheels of other diameters.

Obviously certain parts of this combination can be changed or replaced by others without departing from the spirit of this invention. It is for instance possible to accommodate the intermediate shafts e and j together with gear members mounted thereon aside of or above, instead of below the spindle. It is further not necessary that the operating levers q and r of the two couplings be mounted on the same rod, for they might also be connected by an intermediate lever, whereby they would be forced to always move in opposite directions.

Instead of the toothed rims mounted directly on the hollow friction cones separate gear wheels might be provided and the friction couplings might also be replaced by other types of such couplings. A change wheel power transmission c, d may also be replaced by other change speed driving means, for instance a reversible electromotor of some suitable kind or by some other change speed gear.

I wish it to be understood that I do not desire to be limited to the exact details of construction shown and described for obvious modifications will occur to a person skilled in the art.

I claim:

1. An automatic lathe comprising in combination, a lathe spindle, means for reversing the direction of rotation of said spindle, a pair of parallel intermediate shafts, wheels mounted on and coupling said shafts with each other, a friction coupling on each shaft, means for transmitting power from each friction coupling to one side of said reversing gear, means for coupling said friction couplings with each other and means whereby said two friction couplings can be thrown in only alternatingly.

2. An automatic lathe comprising in combination, a lathe spindle, means for reversing the direction of rotation of said spindle, a pair of parallel intermediate shafts, wheels mounted on and coupling said shafts with each other, change speed gear for driving one of said shafts, a friction coupling on each shaft, means for transmitting power from each friction coupling to one side of said reversing gear, means for coupling said friction couplings with each other and means whereby said two friction couplings can be thrown in only alternatingly.

KARL TESSKY.